(12) United States Patent
Snadden et al.

(10) Patent No.: US 7,670,079 B2
(45) Date of Patent: Mar. 2, 2010

(54) COMBINATION MOUNTING RING

(75) Inventors: Antony Snadden, Bristol (GB); Marcus Baker, Bristol (GB)

(73) Assignee: Saint-Gobain Performance Plastics Rencol Limited, Bristol (GB)

( * ) Notice: Subject to any disclaimer, the term of this patent is extended or adjusted under 35 U.S.C. 154(b) by 0 days.

(21) Appl. No.: 11/852,236

(22) Filed: Sep. 7, 2007

(65) Prior Publication Data
US 2008/0060905 A1    Mar. 13, 2008

(30) Foreign Application Priority Data

Sep. 7, 2006 (GB) ................. 0617579.8
Jun. 29, 2007 (GB) ................. 0712684.0

(51) Int. Cl.
*F16B 7/04* (2006.01)

(52) U.S. Cl. .................. 403/372; 384/535; 411/520

(58) Field of Classification Search ............... 403/367, 403/371, 372; 411/520, 521; 384/535, 581
See application file for complete search history.

(56) References Cited

U.S. PATENT DOCUMENTS

| | | | | |
|---|---|---|---|---|
| 979,317 A * | 12/1910 | Lockwood | ................. | 384/569 |
| 2,188,251 A * | 1/1940 | Nelson | ................. | 384/517 |
| 2,506,404 A * | 5/1950 | Morton et al. | ................. | 384/535 |
| 3,156,281 A * | 11/1964 | Demi | ................. | 411/147 |
| 3,233,497 A * | 2/1966 | McCormick | ................. | 411/517 |
| 4,144,957 A * | 3/1979 | de Gennes | ................. | 192/98 |
| 4,642,995 A * | 2/1987 | Bachler et al. | ................. | 62/6 |
| 4,924,127 A * | 5/1990 | Boireau et al. | ................. | 310/90 |
| 4,981,390 A * | 1/1991 | Cramer et al. | ................. | 403/371 |
| 5,059,042 A * | 10/1991 | Grierson | ................. | 384/537 |
| 5,087,847 A * | 2/1992 | Giesbert et al. | ................. | 310/90 |
| 5,624,193 A * | 4/1997 | Vogelsberger et al. | ........ | 384/517 |
| 5,931,585 A * | 8/1999 | Malchow et al. | ............ | 384/535 |
| 6,318,900 B1 * | 11/2001 | Bere et al. | ................. | 384/535 |
| 6,409,390 B1 * | 6/2002 | Bouzakis et al. | ............ | 384/517 |
| 2007/0096572 A1 * | 5/2007 | Watkins et al. | ................. | 310/90 |

* cited by examiner

*Primary Examiner*—Daniel P Stodola
*Assistant Examiner*—Joshua T Kennedy
(74) *Attorney, Agent, or Firm*—Larson Newman & Abel, LLP; Chi Suk Kim

(57) ABSTRACT

A combination mounting ring of resilient material, for connecting a shaft within a bore of a housing, has a hollow cylindrical part having radially extending projections. This part is for locating between the outer surface of the shaft and the inner surface of the bore, the radially extending projections being under compression and thus securing the shaft within the bore. The combination mounting ring further has an axial spring element extending radially inward from the cylindrical part and having two portions at different axial positions. The axial spring element is for locating between the shaft and a body axially displaced from the shaft, and serves to minimize axial movement of the shaft within the bore of the housing. The axial spring element may either be an annular part or a tab extending from an axial edge of the cylindrical part.

11 Claims, 6 Drawing Sheets

COMBINATION MOUNTING RING

CROSS-REFERENCE TO RELATED APPLICATIONS

This application claims priority of Great Britain Patent Application No. 0617579.8, filed Sep. 7, 2006, and Great Britain Patent Application No. 0712684.0, filed Jun. 29, 2007, the contents of which are hereby incorporated by reference.

FIELD OF THE INVENTION

1. Background of the Invention

The present invention relates to a mounting ring. It also relates to an assembly having a housing with a bore therein and a shaft or bearing (hereinafter the term "shaft" encompasses a bearing) received in the bore and connected thereto to be held in the bore by such a mounting ring.

2. Description of the Prior Art

It is known to connect together a housing and a shaft received in a bore of the housing by a mounting ring in the form of a tolerance ring. The tolerance ring may be used to hold the shaft in place in the bore, or it may act as a force limiter to permit torque to be transmitted between the shaft and the housing. Tolerance rings are used, for example, to transmit torque, provided that torque does not exceed some predetermined value. The use of a tolerance ring permits minor variations in the diameter of the shaft and the bore to be accommodated without affecting the housing and shaft interconnection.

Conventional tolerance rings generally comprise a band of resilient material, for example a metal such as spring steel, the ends of which are brought together to form a band. A strip of projections extend radially outwards from the band, or radially inwards towards the centre of the band. Usually, the projections are formations, possibly regular formations, such as corrugations, ridges, waves or fingers.

When the ring is located in the annular space between, for example, the outer surface of the outer part of a bearing and a bore in a housing in which the bearing is located, the projections are compressed. Each projection acts as a spring and exerts a radial force against the bearing and the surface of the bore, providing an interference fit between the bearing and the housing. Rotation of the housing or the outer part of the bearing will produce similar rotation in the other of the bearing or the housing, as torque is transmitted by the tolerance ring. Likewise, linear movement of the housing or the outer part of the bearing will produce similar linear movement in the other of the bearing or the housing, as the linear force is transmitted by the ring.

If forces (rotational or linear) are applied to one or both of the outer part of the bearing and the housing, such that the resultant force between the mating components is higher than a certain threshold value, the bearing or housing will move relative to one another, i.e. they will slip. In this application, this threshold value is referred to as the "slip force" of the bearing, housing and tolerance ring.

Although tolerance rings usually comprise a strip of resilient material that is curved to allow the easy formation of a ring by overlapping the ends of the strip, they may also be manufactured as an annular band.

Tolerance rings can thus provide torque transfer or torque limiting functions, provide axial retention or al sliding force control by providing an interference fit as the projections are compressed between the mating components of the assembly.

A known tolerance ring 1 is shown in FIG. 1. The tolerance ring 1 comprises a band 11 of spring steel, the ends 12, 13 of which are brought together to form a band. A strip of projections 14 extend radially inwards from the inner circumferential surface 17 of the band. The projections 14 are regular corrugated formations. The strip of projections 14 is axially flanked by annular regions 15, 16 of the band of resilient material 11 that have no formations.

FIG. 2 shows the known tolerance ring 1 of FIG. 1 in use in an electric motor. When the components shown in FIG. 2 are assembled, the electric motor comprises a rotor 6 mounted on a shaft 5 in a housing 3. The shaft 5 passes through bearings 2, tolerance rings 1, wavy washers 4 (discussed below), and end caps 7 of the motor. On assembling the motor, the tolerance rings 1 are located in the housing 3, and then each bearing 2 is pressed into one of the tolerance rings 1 in the housing 3 to compress the projections 14 of the tolerance ring 1, as described above, to retain each of the bearings 2 relative to the housing 3, without the need for tight machining tolerances or glue.

A problem with known assemblies of a bearing, housing and tolerance ring, such as in the electric motor of FIG. 2, is that, if the assembly gets hot, the housing may expand thereby increasing the annular space between the housing and the outer part of the bearing. When this happens, the bearing may be permitted to move axially relative to the housing, and the races of the bearing may be permitted to move axially relative to each other (i.e. rattle), which can lead to excessive wear between the balls of the bearing and the races, and also reduced NVH (noise, vibration and harshness) performance. In order to compensate for this, it is known to use "wavy washers" adjacent to bearings, to pre-load the bearings. Pre-loading is the application of a controlled axial load across a pair of bearings to force the rolling elements to assume a contact angle to remove free internal clearances, i.e. to cushion or prevent axial movement of parts of the bearing relative to each other.

A "wavy washer" is a piece of resilient material, such as spring steel, which takes a generally hoop or halo form. However, rather than being a plane hoop in a radial-circumferential plane, the material of a wavy washer can take the form of a wave, such that, with reference to the radial-circumferential plane, some portions of the hoop extend further axially from the plane than other portions. This formation enables the wavy washer to act as an axial spring.

A pair of known wavy washers 4 are shown in FIG. 2. When the components in the drawing are assembled, the faces 2a of the inner races 22 of the bearings 2 abut the faces 5a, 5b of the shaft 5, and the wavy washers 4 abut the axially opposite faces 2b of the outer races 23 of the bearings 2. The bearings are then said to be pre-loaded.

FIG. 3 shows a cross section through the left hand one of the pair of bearings 2 of FIG. 2, when the components in FIG. 2 are assembled. FIG. 3 demonstrates that the inner race 22 of the bearing 2 is urged leftwards (by the shaft 5), and the outer race 23 of the bearing 2 is urged rightwards (by the resilient wavy washer 4). Thus, even if the assembly gets hot and the tolerance ring 1 fails to provide a sufficient interference fit between the bearing 2 and the housing 3 to prevent relative axial movement of the outer race 23 and the housing 3, and thus relative axial movement of races 22, 23 of the bearing 2, the wavy washer 4 forces the rolling elements to assume a contact angle "a" to avoid free internal clearances.

While tolerance rings and wavy washers have many beneficial attributes, they can be time-consuming and awkward to fit in an assembly.

SUMMARY OF THE INVENTION

Thus, the present invention has been derived to combine the benefits of a tolerance ring and the benefits of the wavy washer into a single component. In the making of that invention, however, it has been realised that it is possible to modify the structure of the tolerance ring and/or the washer, and still gain the benefits of each. Thus, there needs to be a cylindrical part with projections similar to those of a tolerance ring and a part which provides axial resilience because it has parts at different axial positions, but neither part need necessarily be continuous.

For example, the part equivalent to the tolerance ring may have multiple discontinuities, since the part corresponding to the wavy washer may then provide support which would otherwise not be provided in a tolerance ring with multiple splits.

Similarly, the part equivalent to the wavy washer may also have discontinuities, since the sections of the washer bounded by the discontinuities can each be supported by the part equivalent to the tolerance ring. Hence, the part equivalent to the wavy washer may be a full or partial hoop of material. Indeed, this part may not have an annular shape at all, but may simply comprise a number of discrete elements, each attached separately to the tolerance ring.

Thus, according to a first aspect of the present invention, there may be provided a combination mounting ring, comprising:

a hollow cylindrical part having at least one axially extending discontinuity in its circumference and a series of projections extending radially therefrom; and an axial spring element extending radially inwards from the cylindrical part and formed integrally therewith, the axial spring element having a first portion at a first axial position connected to a second portion at a second axial position different from the first axial position, the first axial position being that at which the axial spring element is joined to the cylindrical part, and the first portion and the second portion being circumferentially unaligned.

Moreover, according to a first development of a first aspect of the present invention, there may be provided a combination mounting ring of resilient material including:

a hollow cylindrical part having at least one axially extending discontinuity in its circumference and a series of projections extending radially therefrom; and an annular part extending radially inwards from said cylindrical part and formed integrally therewith, said annular part having a first part at a first axial position connected to a second part at a second axial position different from the first axial position, the first axial position being that at which the annular part is joined to the cylindrical part.

This combination of features reduces the number of components required to provide both a tolerance ring and a wavy washer. The cylindrical part acts as a tolerance ring and the annular part acts as a wavy washer. Moreover, the assembly of parts in an assembly is eased, the number of suppliers required to provide parts corresponding to both of the components is reduced, and the cost of providing the parts can also be reduced.

It should be noted that although we have referred above to an axially extending discontinuity, the present invention is not limited to the case where that discontinuity extends only in the axial direction. It may, for example, be inclined so that it has an axial component and a component in e.g. a partially circumferential direction.

There may be at least two multiple discontinuities in the cylindrical part, in which case adjacent discontinuities define portions of the cylindrical part between them. If there is a plurality of such portions of the cylindrical part, the portions may each have a single one of said projections or a plurality of said projections extending therefrom. There may be an equal number of projections on each portion. In any case, the circumferential spacing of the projections may be equal between all pairs of adjacent projections. The projections may extend radially inwards or radially outwards from the cylindrical part.

The annular part performs as an axial spring. Since it is made from a resilient material, it has a capacity to absorb energy when it is deformed elastically on application of an axial force against it to reduce the axial distance between the first and second parts and then, upon removal of the force, to recover this energy and return to its original shape.

Preferably the first and second parts of the annular part are circumferentially unaligned. This allows the first and second parts to move more easily relative to each other in an axial direction. The first and second parts of the annular part may be arranged such that the annular part extends in the same axial direction, or the opposite axial direction, to that in which the cylindrical part extends from the point at which the annular part and the cylindrical part are joined.

The annular part may have a plurality of such first and second parts. The first parts may each only be connected to a single second part. Alternatively, each first part may be connected to adjacent second parts on both sides of it. Thus, the annular part may be a full or a partial hoop of material, i.e. there may be no, one, or a plurality of gaps in the annular part.

The first and second parts of the annular part may be joined by a curved wave of material. A plurality of first and second parts, joined together by wave formations, may be alternately spaced circumferentially around the annular part. There may be gaps in the annular part between some of the first and second parts, or some or all of the first parts may comprise flat spots, i.e. located only in the radial-circumferential plane and being non-axially-extending. Alternatively still, the annular part may be formed such that the plurality of first and second parts are joined together by a continuous wave around the annular part, i.e. with no flat spots or gaps in the annular part.

If there is a plurality of such first and second parts of the annular part, preferably all of the second parts are arranged such that they are located on the same axial side of the first part as each other. Preferably all the second parts are located at the same axial position as each other, though they may be located at different axial positions.

Whatever the format of the annular part, preferably the circumferential spaces between all the second parts are equal to each other.

In the combination mounting ring of the first development of the first aspect of the invention, the element providing resilience in the axial direction (i.e. the element performing the "wavy washer" function) has an annular shape. However, it is possible for this resilient function to be provided by a plurality of discrete axial spring elements each attached to a different point on the cylindrical part performing the function of a tolerance ring.

A complete annular part for the wavy washer is therefore not necessary, which can reduce the amount of material needed for the combination mounting ring and reduce material wasted during manufacture. The configuration proposed below can be cut from a single flat blank of material without requiring holes (e.g. corresponding to the inside of a ring) to be formed inside the blank.

Hence, according to a second development of the first aspect of the invention, there may be provided a combination mounting ring of resilient material including:

a deformable band for mounting between an inner component and an outer component, the band having a plurality of radially extending projections around its circumference to provide an interference fit between the inner and outer components, and two or more discrete axial spring elements extending radially inwards from an axial edge of the deformable band, each axial spring element having a first contact surface axially displaced from and resiliently connected to a second contact surface, the first and second contact surfaces facing in opposite axial directions.

In use, the axial spring elements may be sandwiched between the inner component and a static body (e.g. part of the outer component), whereby they exert a spring force on the inner component through relative axial movement between the first and second contact surfaces. If the inner component moves slightly axially within the outer component, the resilience of the axial spring elements can compensate to maintain a spring force on the inner component. Thus, if the inner component comprises a bearing, a loading force provided by the axial spring elements can be maintained.

The first contact surface may face in an opposite axial direction from the axial extent of the band. The second contact surface may therefore be arranged to abut the inner component.

Each axial spring element may comprise a substantially circumferentially extending strip of resilient material (e.g. spring steel) that is deformed to provide the first and second contact surfaces. For example, the strip may have a central part and end parts which are bent away from the central part in an axial direction to terminate at edges which are axially spaced from the central part. The central part may be flat. The first contact surface may be the central part and the second contact surface may be the edges of the strip at the end of the end parts. Alternatively, the strip may comprise one or more axially extending projections, e.g. waves, corrugations or the like. The projections may extend towards or away from the direction of axial extent of the band. The first and second contact surfaces may therefore be the top of the projection(s) on one side of the strip and the footprint of the projection(s) on the other side of the strip respectively. Whilst the projections are preferably integral with the circumferential strip, there may be attached e.g. glued or welded thereto.

An advantage of one or more projections is that their stiffness can be controlled according to their shape (not just according to the properties of the resilient material). Thus, the axial spring elements can be shaped to provide a desired axial loading.

Each axial spring element may be attached to the band by a tab. The tab may be attached to an axial edge of the band. The axial spring elements, tabs and band may be integrally formed from a single piece of material.

The tabs may therefore comprise strips of material bent radially inwards from the band. The tabs may be connected to the central part of their respective axial spring element. In this embodiment, each axial spring element may resemble a T extending inwardly in a radial direction from the band.

The axial spring elements may be arranged in a symmetrical fashion around the circumference of the band. This can enable an even application of force on the inner component. There may be three, four or more axial spring elements.

Each radially extending projection on the band may comprise a rounded ridge, e.g. a wave, which rises to and falls from a radial peak. In such a case, the force transmitted by the projection is concentrated around the edges where it meets the band (its "footprint"). The projections may extend inwardly or outwardly from the band.

The band may be a resilient split ring, e.g. an open loop of material extending partly around the perimeter of the inner component. The configuration of projections may be symmetrical around the circumference of the ring with respect to the split. This arrangement may be particularly stable.

The inner and outer components may comprise a shaft that is receivable in a bore formed in a housing. The bore may extend fully through the housing or only extend partially through or into the housing. The inner component may further comprise a bearing mounting on the shaft which can be preloaded by the axial spring elements.

Thus, according to a second aspect of the present invention, there may be provided an assembly comprising:

a first mating component, being one of a housing having a bore with a shaft therein, and said shaft;

a second mating component, being the other of a bore with a shaft therein, and said shaft;

a combination mounting ring comprising:

a hollow cylindrical part having at least one axially extending discontinuity in its circumference and a series of projections extending radially therefrom; and an axial spring element extending radially inwards from said cylindrical part and formed integrally therewith, said axial spring element having a first portion at a first axial position connected to a second portion at a second axial position different from said first axial position, said first axial position and said second axial position defining a first axial distance therebetween, said first axial position being that at which said axial spring element is joined to said cylindrical part, and said first portion and said second portion being circumferentially unaligned, said combination mounting ring being arranged such that said cylindrical part is located between said shaft and said housing; and a body arranged such that said axial spring element of said combination mounting ring is located between said body and said shaft;

wherein said shaft applies an axial force against said axial spring element of said combination mounting ring such as to reduce said first axial distance and press said axial spring element into contact with the body; and wherein said first mating component contacts and applies a radial force against said projections of said cylindrical part of said combination mounting ring such as to compress said projections and press said cylindrical part into contact with said second mating component, thereby to secure together said shaft and said housing.

Moreover, according to a first development of a second aspect of the present invention, there may be provided an assembly including:

first and second mating components, the first and second mating components being, respectively, either:

a housing having a bore with a shaft therein, and the shaft, or a shaft, and a housing having a bore with the shaft therein;

a combination mounting ring according to the first development of the first aspect of the present invention arranged such that its cylindrical part is located between the shaft and the housing; and a body arranged such that the annular part of the combination mounting ring is located between the body and the shaft;

wherein the shaft applies an axial force against the annular part of the combination mounting ring such as to reduce the axial distance between the first and second parts of the annular part and press the annular part into contact with the body; and wherein the first mating component contacts and applies a radial force against the projections of the cylindrical part of the combination mounting ring such as to compress the projections and press the cylindrical part into contact with the second mating component, thereby to secure together the shaft and the housing.

Preferably the shaft contacts the second part of the annular part of the combination mounting ring, with the first part contacting the body. However, the shaft may instead be in contact with the first part of the annular part, such that the second part is in contact with the body.

According to a second development of the second aspect of the invention, there may be provided an apparatus comprising:

an inner component, an outer component arranged to receive the inner component, and a combination mounting ring having a deformable band for mounting between the inner component and the outer component, the band having a plurality of radially extending projections around its circumference to provide an interference fit between the inner and outer components, and two or more discrete axial spring elements extending radially inwards from an axial edge of the deformable band to provide an axial spring force on the inner component, wherein each axial spring element has a first contact surface axially displaced from and resiliently connected to a second contact surface, and the first and second contact surfaces face in opposite axial directions.

The combination mounting ring may include any of the features discussed above, in the second development of the first aspect of the invention.

The inner and outer components may be a shaft and a housing respectively. The housing may comprise a bore for receiving the shaft and may further comprise a body arranged to axially face the shaft when the shaft is received in the bore.

The axial spring elements may abut part of the outer component which axially faces the inner component, whereby the spring elements are compressed between the outer and inner components to provide the axial spring force. The resilience of the spring elements is such that an axial force can be maintained even if the inner and outer components make minor axial movements relative to each other.

In either of the first and second developments of the second aspect of the invention, the "shaft" can be a solid or a hollow component, or the outer component of a complex component formed of several parts, such as a bearing. The "bore" may extend fully through the housing, or only extend partially into or through the housing.

In the case that the shaft comprises a bearing, either the first or second contact surfaces of the axial spring elements may be arranged to abut an outer race of the bearing. The shaft may include a radial projection on the opposite side of the bearing from the axial spring elements which abuts the inner race of the bearing to permit the axial spring force to pre-load the bearing.

The projections may be in contact with either the surface of the bore of the housing or with the surface of the shaft, depending on which is the first mating component.

The assembly produces resistance to both axial and rotational movement of the shaft relative to the housing. The securing together of the shaft and the housing is achieved due to frictional engagement between the shaft and the cylindrical part and frictional engagement between the cylindrical part and the housing. Such securing should normally be sufficiently strong to prevent relative movement of the shaft and the housing under normal use, but to permit relative movement in extreme circumstances. It is then desirable that the strength of frictional engagement between said projections of the cylindrical part and the surface of the first mating component is stronger than the frictional engagement between the cylindrical part and the second mating component, so that the combination mounting ring will remain secured to the first mating component whilst any relative slipping between the shaft and housing occurs at the boundary between the cylindrical part and the second mating component.

The cylindrical part may be an open or closed loop of material, i.e. it may extend entirely or only partly around the perimeter of the shaft, and the projections of the cylindrical part may be arranged such that pairs of the projections are diametrically opposing.

Other aspects of the invention may comprise a method of manufacturing the above-described combination mounting ring and a pre-assembly comprising the combination tolerance ring mounted in a stable configuration on one of the inner or outer components.

BRIEF DESCRIPTION OF THE DRAWINGS

Embodiments of the present invention will now be described in detail, by way of example, with reference to the accompanying drawings, in which.

DETAILED DESCRIPTION

Figure 1:
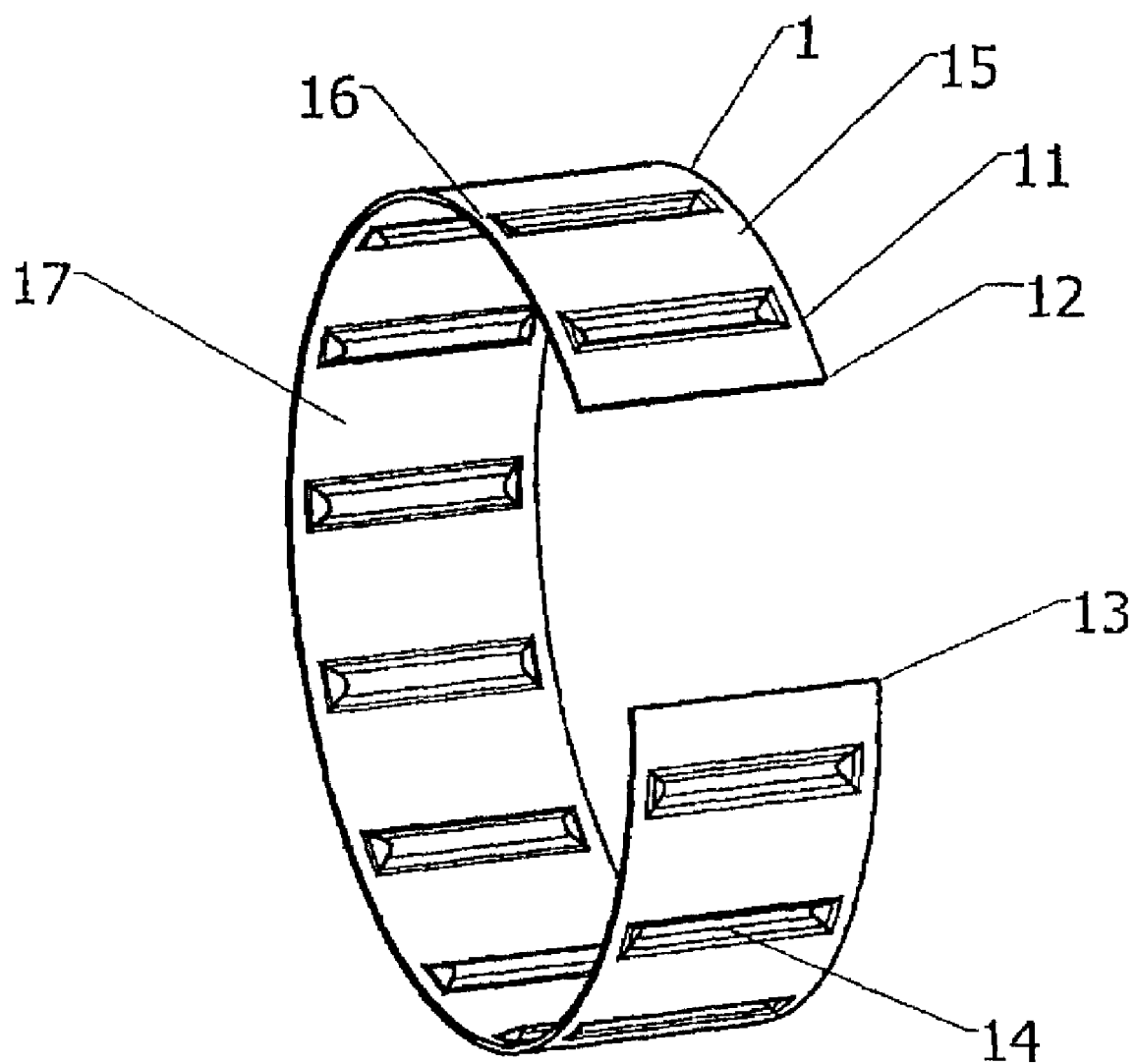
FIG. 1 shows an oblique view of a known tolerance ring.
Figure 2:
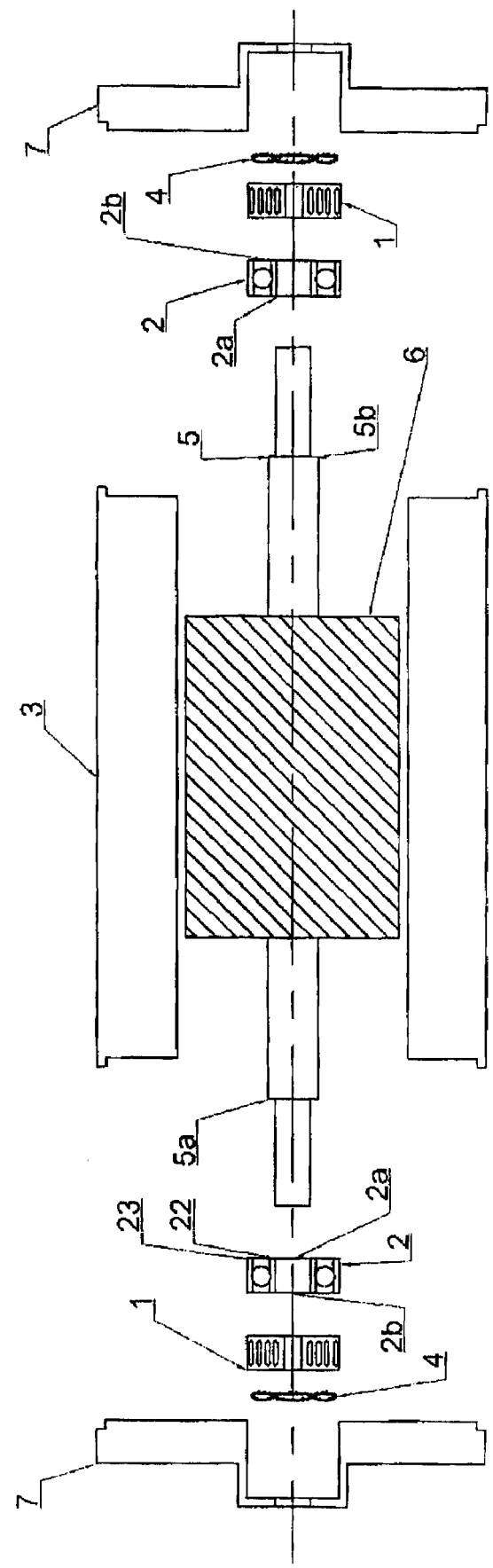
FIG. 2 shows an exploded view of a known electric motor assembly which incorporates both known tolerance rings and known wavy washers.
Figure 3:
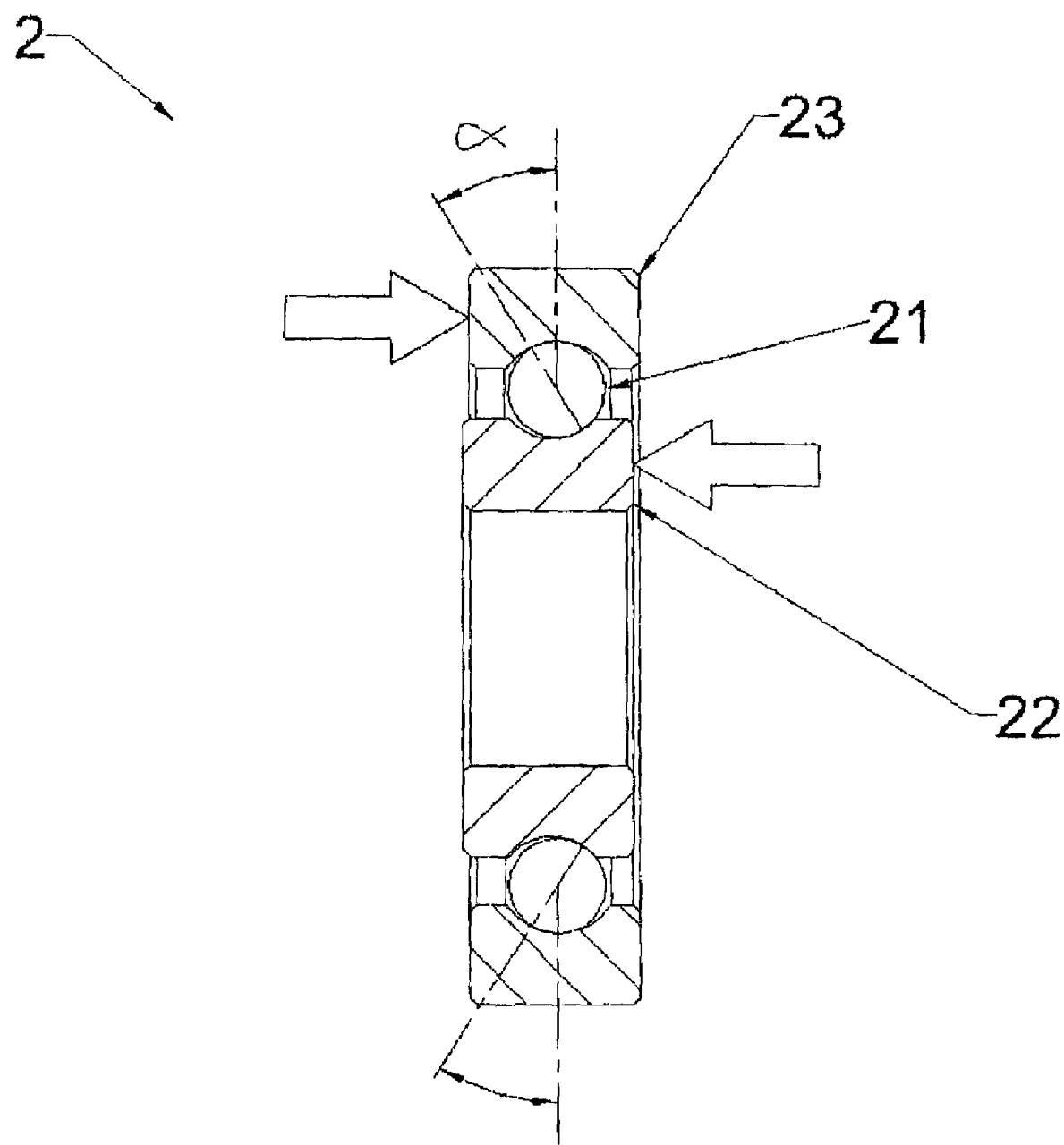
FIG. 3 shows a cross-section of a pre-loaded bearing.

FIGS. 1 to 3 show known components and have already been discussed.

Figure 4:
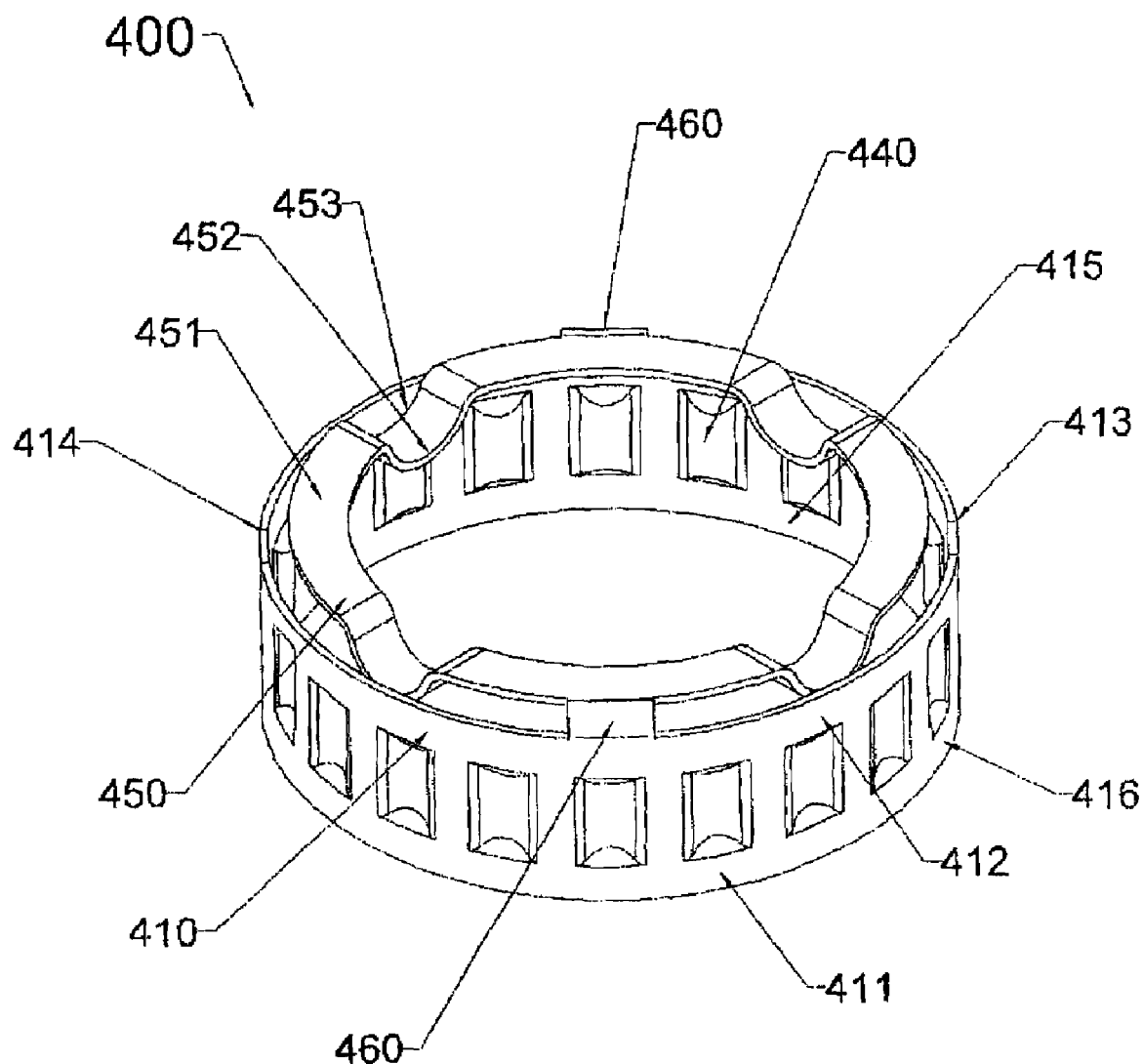
FIG. 4 shows an oblique view of a combination mounting ring which is a first embodiment of the present invention.

FIG. 4 shows a first embodiment of a combination mounting ring 400 of spring steel according to the present invention. The combination mounting ring 400 includes a hollow cylindrical part 410 with a series of projections 440 extending radially inwards from the inner surface thereof. In other embodiments, these projections may extend radially outwards from the external surface of the cylindrical part 410. The cylindrical part 410 has the general form of a band and the series of projections 440 is axially flanked by annular regions 411 and 412 of the cylindrical part 410 that have no formations.

The cylindrical part 410 has two axially extending discontinuities 413, 414 in its circumference, such that the cylindrical part 410 in fact comprises two continuous portions 415, 416 separated by the gaps 413, 414. Each portion 415, 416 has nine projections 440 extending from it. The projections 440 of each portion 415, 416 are equally spaced, but the spaces between adjacent projections 440 on either side of the discontinuities between the portions 415, 416 are slightly larger. In other embodiments of the present invention, there may be several more discontinuities formed in the cylindrical part 410, in which case each portion may have a single projection 440 extending from it, or a plurality of projections 440, and all the projections 440 may have equal spaces between them.

The combination mounting ring 400 also includes an annular part 450 which extends radially inwards from the cylindrical part 410. The annular part 450 is a full hoop of material that is formed integrally with the cylindrical part 410, and the two parts are joined by tabs 460. Each tab 460 connects the annular part 450 to one of the two portions 415, 416 of the cylindrical part 410. In embodiments where there are more than two portions of the cylindrical part 410 separated by discontinuities in the circumference of the cylindrical part 410, there would, of course, be a tab 460 from the annular part 450 to each of the portions.

The annular part 450 includes a first part 451 which is a "flat spot" lying purely in the radial-circumferential plane, and is non-axially-extending. Indeed, the annular part 450 actually includes four such first parts 451. Between pairs of the first parts 451, there are second parts 452 of the annular part 450 which are each located at a second and different axial position from the first part 451. In this embodiment, the second parts 452 are arranged such that they are all located on the same axial side of the first parts 451, and at the same axial position as each other. Moreover, the first and second parts 451, 452 are arranged such that the annular part 450 extends in the same axial direction from the tabs 460 as that in which the cylindrical part 410 extends, though it is conceivable that the annular part 450 may instead extend in the opposite axial direction, i.e. upwards as FIG. 4 is presented. Circumferential spacing is equal between each pair of adjacent second parts 452. Each second part 452 is connected to adjacent first parts 451 on both sides of it, via a wave 453 of material.

Figure 5B:
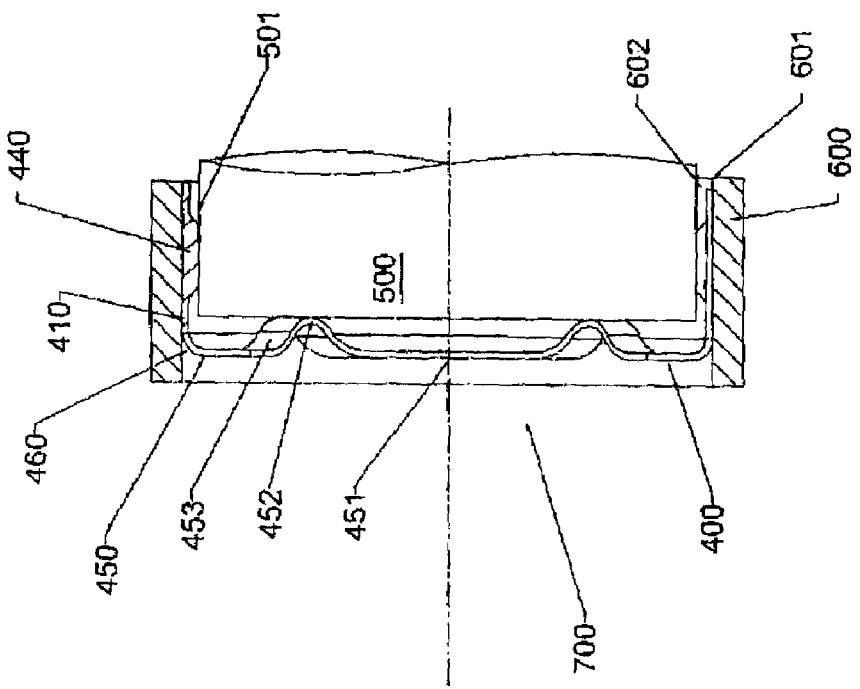
FIG. 5B is a cross section taken along the line Y-Y in FIG. 5A.
Figure 5A:
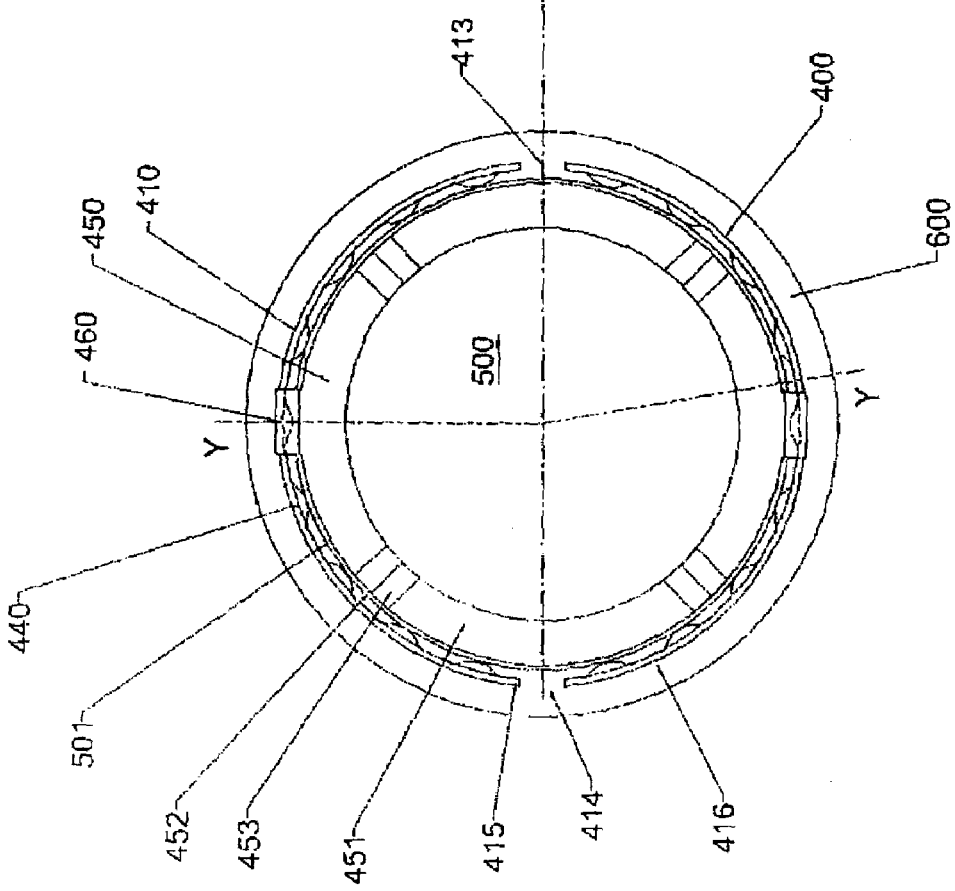
FIG. 5A is a view looking axially towards the combination mounting ring of FIG. 4 when it is mounted between a bearing and a housing.

With reference to FIGS. 5A and 5B, an embodiment of an assembly according to the invention will now be described, which assembly includes the cylindrical part 410 of the combination mounting ring 400 (described above) located in the annular space between the surface 601 of a bore 602 in a housing 600 and the outer surface 501 of the outer part of a bearing 500. The bearing 500 is mounted on a tube, but for clarity in FIGS. 5A and 5B, only the bearing 500 is represented, and it is shown as a simple solid shaft. The annular part 450 of the combination mounting ring 400 is located between the bearing 500 and a body (shown generally as 700 in FIG. 5B) with its four second parts 452 in direct contact with the bearing 500, and the body 700 contacting the flat opposite axial side of the annular part 450, i.e. the four first parts 451. The annular part 450 is compressed between the bearing 500 and the body 700.

In addition, although not shown explicitly in the drawings, a second bearing, combination mounting ring and body are located rightwards of the components shown in FIGS. 5A and 5B and in a mirror-image manner, similarly to the components in the conventional system of FIG. 2. Thus, the second bearing is mounted on the other end of the tube with the cylindrical part of the second combination mounting ring located between the outer part of that second bearing and the housing with its projections compressed, and the annular part of the second combination mounting ring compressed between the second bearing and the second body. Thus, with opposing forces applied by the compressed annular parts of the combination mounting rings on the bearings and the tube, the bearings are pre-loaded, as described above.

In FIGS. 5A and 5B, the projections 440 of the cylindrical part 410 extend radially inwards, and the outer surface 501 of the bearing 500 is in contact with each of the projections 440. The bearing 500 applies a radial force against each of the projections 440 thereby compressing each of the projections 440 and pressing the cylindrical part 410 of the combination mounting ring 400 into contact with the surface 601 of the bore 602 of the housing 600. The bearing 500 and the housing 600 are thereby secured together by frictional engagement between the bearing 500 and the cylindrical part 410 and between the housing 600 and the cylindrical part 410. This securing is sufficiently strong to prevent relative movement of the bearing 500 and the housing 600 under normal use, but permits relative movement if an axial force or torque above a predetermined threshold is applied to the housing 600 or the outer part of the bearing 500.

The strength of frictional engagement between said projections of the cylindrical part 410 of the combination mounting ring 400 and surface 501 of the bearing 500 is stronger than the frictional engagement between the cylindrical part 410 and the surface 601 of the housing 600, so that the combination mounting ring 400 will remain secured to the bearing 500 whilst any relative slipping between the bearing 500 and housing 600 occurs at the boundary between the cylindrical part 410 and the housing 600.

If the assembly gets hot, resulting in the annular space between the surface 501 of the bearings 500 and the surface 601 of the bore 602 expanding, the frictional engagement between the outer surface of the combination mounting rings 400 and the surface 601 of the bore 602 will lessen, thus potentially allowing the combination mounting rings 400 to move relative to the housing 600. However, since the annular parts 450 of the combination mounting rings 400 are compressed between the bearings 500 and the bodies 700, i.e. with no free internal clearance in an axial direction, any axial movement of the bearings 500 relative to the housing 600 is cushioned. Thus, NVH performance is maintained and rattling is avoided, when the assembly gets hot.

In another embodiment, the projections 440 of the cylindrical parts 410 extend radially outwards and contact the surface 601 of the bore 602 of the housing 600. In this alternative embodiment, any relative slipping between the bearings 500 and the housing 600 will occur at the interface between the cylindrical parts 410 and the outer surfaces 501 of the bearings 500. However, even if this alternative assembly gets hot, and the annular space between the bearings 500 and the housing 600 expands, any relative axial movement of the bearings 500 and the housing 600 will still be absorbed by the compressed annular parts 450 of the combination mounting rings 400, in the same manner as described above.

Figure 6:
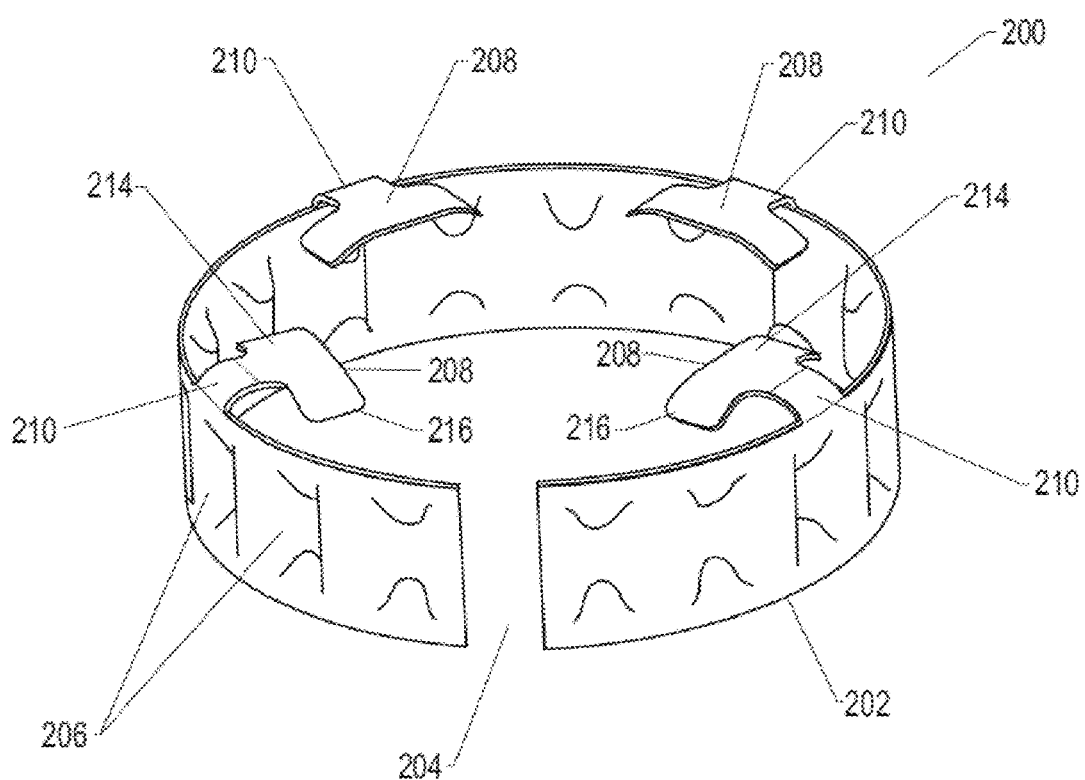
FIG. 6 is a perspective view of a combination mounting ring that is a second embodiment of the invention.

FIG. 6 shows a second embodiment of a combination mounting ring 200 having a resilient cylindrical band 202 formed e.g. by bending a strip of spring steel. An axial split 204 occurs in the circumference of the band 202. This permits the band 202 to open or close to be retained on or in a inner or outer component. For example, the split 204 may be closed to allow the band 202 to be placed inside a bore in a housing (not shown). On release, the resilience of the band 202 causes the split to open again, whereby the band 202 is retained against the surface of the bore. Although the split 204 is open in this embodiment, it is possible for it to be closed, i.e. for the circumferential ends of the band to overlap.

A plurality of projections 206 extend radially inwards from the band 202. Each projection is a rounded ridge 206, e.g. formed by stamping the band 202 before it is bent into its cylindrical configuration.

Four axial spring elements 208 are attached via tabs 210 to four separate locations on an axially facing edge 212 (upper edge in FIG. 6) of the band 202. Each tab 210 is an inwardly bent strip of material (e.g. integral with the band 202) so that each axial spring element 208 extends radially inwards from the circumference of band 202. Each axial spring element 208 is a substantially circumferentially (e.g. substantially parallel to a tangent to the band as shown in FIG. 6) extending strip of resilient material. The strip is bent to form a first contact surface 214 (shown facing upwards in FIG. 6) and a second contact surface 216 (downwardly facing edges in FIG. 6) at axially spaced locations. The resilience of the axial spring elements 208 allows the strip of material to flex whereby the first and second contact surfaces 214, 216 move relative to one another. Axially compressing the spring elements 208 causes a force to occur which acts to restore the first and second contact surfaces to their rest positions.

Figure 7:
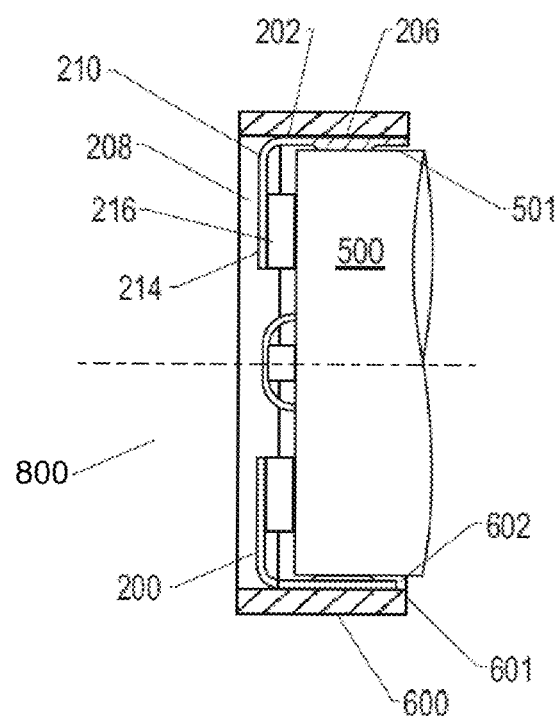
FIG. 7 is a cross section view of the combination mounting ring of FIG. 6 when it is mounted between a bearing and a housing.

FIG. 7 shows an embodiment of an assembly including the combination mounting ring 200 (described above) located in the annular space between the surface 601 of a bore 602 in a housing 600 and the outer surface 501 of the outer part of a bearing 500. The resilient cylindrical band 202 of the combination mounting ring 200 is located between the bearing 500 and a body (generally as 800) with the second contact surface 216 of the spring elements 208 in direct contact with the bearing 500, and the body 800 contacting the first contact surface 214.

The axial spring elements 208 in FIG. 6 are provided at substantially regular intervals around the band 202. In practice, the intervals may be chosen so that they are equal when the band is compressed within an outer component or stretched over an inner component.

The combination mounting ring 200 may be manufactured from a single strip of material, i.e. the band 202 and the axial spring elements 208 may be integral with one another. The process may begin with a flat piece of resilient material (e.g. spring steel) which is cut into a blank comprising an elongate strip of material to form the band having a plurality of T-shaped projections extending in plane from a top edge thereof. This cutting process may waste less material than a process for preparing a combination mounting ring having a unbroken annular element because a central hole of the annular element is not lost (wasted).

After the blank is cut from the piece of material, the projections in the band and the curved configuration of the axial spring elements may be formed by stamping and possibly heat treating the blank. The combination mounting ring may achieve its final shape by bending the elongate strip into the band and bending the T-shaped elements inwards over a hollow cylinder formed by the band. The T-shaped elements may be bent inwards before the elongate strip is curled.

What is claimed is:

1. A combination mounting ring, comprising:
a hollow cylindrical part having a first axial edge and a second axial edge, the cylindrical part having at least one axially extending discontinuity in its circumference and a series of projections extending radially therefrom; and
a plurality of discrete axial spring elements being substantially circumferentially extending strips of resilient material each having a first portion and a second portion, the first portion of each of said strips of material being attached to said first axial edge by a tab comprising a bent strip of material extending axially outwardly and radially inwardly from the first axial edge;
wherein said first portion of each of said strips of material is located at a first axial position axially and radially displaced from the plane of the first axial edge and said second portion of each of said strips of material is bent towards the first axial edge such that the second portion is located at a second axial position closer to said first axial edge than said first portion.

2. The combination mounting ring according to claim 1, wherein each said axial spring element has a plurality of said second portions.

3. A combination mounting ring of resilient material including:
a deformable band for mounting between an inner component and an outer component, said band comprising a circumferentially-extending wall, said wall being bounded by a first axial edge and a second axial edge,
said band having a plurality of radially extending projections around said circumferentially-extending wall to provide an interference fit between said inner component and said outer component, and
a plurality of discrete axial spring elements being substantially circumferentially extending strips of resilient material each having a first portion and a second portion, the first portion of each of said strips of material being attached to said first axial edge by a tab comprising a bent strip of material extending axially outwardly and radially inwardly from the first axial edge;
wherein said first portion of each of said strips of material is located at a first axial position axially and radially displaced from the plane of the first axial edge and said second portion of each of said strips of material is bent towards the first axial edge such that the second portion is located at a second axial position closer to said first axial edge than said first portion.

4. An assembly including:
a housing having a bore with a shaft therein, the shaft having a bearing mounted thereon;
a combination mounting ring mounted between the housing and bearing, the combination mounting ring comprising:
a hollow cylindrical part having a first axial edge and a second axial edge, the cylindrical part having at least one axially extending discontinuity in its circumference and a series of projections extending radially therefrom, and
a plurality of discrete axial spring elements being substantially circumferentially extending strips of resilient material each having a first portion and a second portion, the first portion of each of said strips of material being attached to said first axial edge by a tab comprising a bent strip of material extending axially outwardly and radially inwardly from the first axial edge;
wherein said first portion of each of said strips of material is located at a first axial position axially and radially displaced from the plane of the first axial edge and said second portion of each of said strips of material is bent towards the first axial edge such that the second portion is located at a second axial position closer to said first axial edge than said first portion
wherein the cylindrical part of the combination mounting ring is located between the shaft and the housing so that the projections are radially compressed between the bore and the bearing, and the second portion of the axial spring element abuts the bearing; and
a body arranged relative to the housing, whereby the axial spring element of the combination mounting ring is located between the body and the bearing and the first portion of the axial spring element abuts the body.

5. The assembly according to claim 4, wherein each said axial spring element has a plurality of the second portions.

6. The assembly according to claim 4, wherein the bearing includes an inner race and an outer race, the axial spring element contacts a face of the outer race, and the shaft comprises an abutment member abutting a face of the inner race opposite the face of the outer race contacted by the axial spring element to urge the first and second portions of the axial spring element towards one another to generate an axial spring force that loads the bearing.

7. An assembly comprising:
a housing having a bore with a bearing therein; and
a combination mounting ring having:
   a deformable band mounted between the bearing and the housing, the band comprising a circumferentially extending wall, the wall being bounded by a first axial edge and a second axial edge, and the band having a plurality of radially extending projections around the circumferentially-extending wall which are radially compressed between the bearing and housing to provide an interference fit between them, and
   a plurality of discrete axial spring elements being substantially circumferentially extending strips of resilient material each having a first portion and a second portion, the first portion of each of said strips of material being attached to said first axial edge by a tab comprising a bent strip of material extending axially outwardly and radially inwardly from the first axial edge;
   wherein said first portion of each of said strips of material is located at a first axial position axially and radially displaced from the plane of the first axial edge and said second portion of each of said strips of material is bent towards the first axial edge such that the second portion is located at a second axial position closer to said first axial edge than said first portion
      wherein the second contact surfaces of the axial spring elements abut the bearing.

8. The assembly of claim 7, comprising a body arranged such that the axial spring elements of the combination mounting ring are located between the body and the bearing, whereby the first portions of the axial spring elements abut the body.

9. The assembly of claim 8, wherein the bearing includes an inner race and an outer race, the axial spring elements each contact a face of the outer race, and the shaft comprises an abutment member abutting a face of the inner race opposite the face of the outer race contacted by the axial spring elements to urge the first and second portions of each axial spring element towards one another to generate an axial spring force that loads the bearing.

10. A pre-assembly comprising:
a combination mounting ring; and
a bearing mounted within the mounting ring,
wherein the combination mounting ring comprises
   a hollow cylindrical part having a first axial edge and a second axial edge, the cylindrical part having at least one axially extending discontinuity in its circumference and a series of projections extending radially therefrom, and
   a plurality of discrete axial spring elements being substantially circumferentially extending strips of resilient material each having a first portion and a second portion, the first portion of each of said strips of material being attached to said first axial edge by a tab comprising a bent strip of material extending axially outwardly and radially inwardly from the first axial edge;
   wherein said first portion of each of said strips of material is located at a first axial position axially and radially displaced from the plane of the first axial edge and said second portion of each of said strips of material is bent towards the first axial edge such that the second portion is located at a second axial position closer to said first axial edge than said first portion.

11. A pre-assembly comprising:
a combination mounting ring; and
a bearing mounted within the mounting ring,
wherein the combination mounting ring comprises
   a deformable band comprising a circumferentially extending wall, the wall being bounded by a first axial edge and a second axial edge, and the band having a plurality of radially extending projections around the circumferentially-extending wall, and
   a plurality of discrete axial spring elements being substantially circumferentially extending strips of resilient material each having a first portion and a second portion, the first portion of each of said strips of material being attached to said first axial edge by a tab comprising a bent strip of material extending axially outwardly and radially inwardly from the first axial edge;
   wherein said first portion of each of said strips of material is located at a first axial position axially and radially displaced from the plane of the first axial edge and said second portion of each of said strips of material is bent towards the first axial edge such that the second portion is located at a second axial position closer to said first axial edge than said first portion
      wherein the second contact surfaces of the axial spring elements abut the bearing.

* * * * *